United States Patent Office 2,951,842
Patented Sept. 6, 1960

2,951,842

UNITARY DIAZINE AND TRIAZINE DYESTUFFS HAVING TWO DIFFERENT ANTHRAQUINONE SUBSTITUENTS ON THE AZINE RING

Friedrich Ebel, Mannheim-Feudenheim, and Hans Weidinger, Ludwigshafen (Rhine), Germany, assignors to Badische Anilin- & Soda-Fabrik Aktiengesellschaft, Ludwigshafen (Rhine), Germany No Drawing. Filed Sept. 17, 1957, Ser. No. 684,414

Claims priority, application Germany Sept. 27, 1956

6 Claims. (Cl. 260—249)

This invention relates to a process for the production of vat dyestuffs and to new vat dyestuffs.

It is already known that vat dyestuffs are obtained by reacting one or more vattable amines with a quinazoline or triazine of the general kind

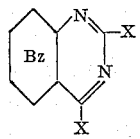

or

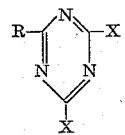

in which for example X represents a halogen atom, Bz a benzene nucleus which may if desired contain further substituents and R a phenyl radical.

Every halogen atom is thereby replaced by the radical of a vattable amine, and the two halogen atoms of the quinazoline or triazine may be replaced by different radicals of vattable amines. However it has never yet been possible to obtain unitary dyestuffs with two different vattable radicals because under the conditions hitherto maintained there are always obtained mixtures of AA, AA', A'A and A'A', the significance of AA etc. being that two identical or two different radicals of vattable amines are attached to the quinazoline or triazine nucleus and moreover in the case of quinazoline there is even a difference between AA' and A'A.

Such mixtures are, however, of small practical importance because, for example, mixed fabrics of cotton and regenerated cellulose are unequally dyed therewith and moreover the dyebath becomes prematurely impoverished in one of the components by reason of the different speeds of absorption and different affinities of the components, so that for example the beginning and end of a long strip of material which has been led through the bath are dyed different shades. Moreover the mixtures are usually unattractive in shade of color and moreover difficultly reproducible. If these disadvantages are to be avoided, it is necessary that hitherto unknown unitary compounds with two different radicals of vattable amines should be prepared and used.

We have now found that such new vat dyestuffs with good tinctorial properties are obtained by reacting with vattable amines a nitrogenous heterocyclic compound containing the grouping

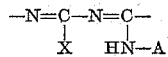

selected from the group consisting of quinazolines of the general Formulas I and II:

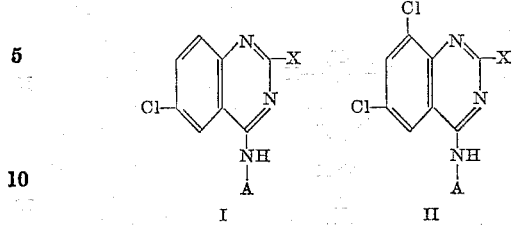

and triazines of the general Formula III:

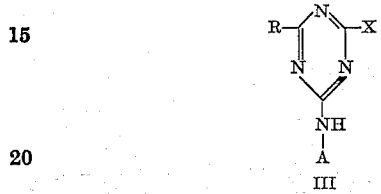

the radical A and the radical of the vattable amine to be reacted therewith being different. In the formulae X represents a chlorine atom, R a phenyl radical and A the radical of a vattable amine.

The hitherto unknown halogen compounds I, II and III are obtained by treating 1 mol of a dihalogen compound of the kind

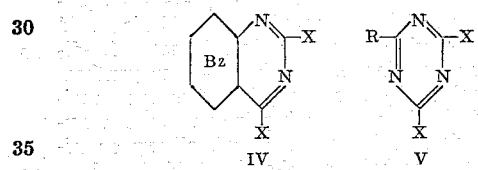

(in which for Example X is a chlorine atom, Bz a benzene nucleus also containing chlorine atoms and R a phenyl radical) in a suitable solvent with 1 mol of an amine ANH₂ (A having the above significance) at temperatures between 50° and 150° C., preferably between 80° and 110° C. Suitable solvents are for example lactams, such as caprolactams or N-methylpyrolidone, and glycols, such as ethylene glycol, and pyridine or quinoline. Under these conditions the compound I, II or III separates out as a unitary crystalline compound, whereas with the usual solvents, such as xylene, chlorbenzene and nitrobenzene, only mixtures of unreacted initial material with its mono- and di-derivatives are obtainable.

Thus quinazolines of the general Formula IV, in which X is a chlorine or bromine atom and Bz is a benzene nucleus also containing chlorine or bromine atoms or alkyl, aryl, trifluormethyl, aminosulfonyl or alkylsulfonyl groups or in which the benzene nucleus is annexed to other benzene nuclei, as for example 2.4.6-trichlorquinazoline or 2.4.6.8-tetrachlorquinazoline, can be converted by reaction with vattable amines in the above mentioned suitable solvents into the quinazolines of the general Formula VI

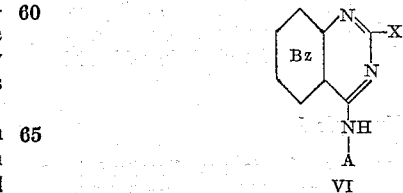

necessary for the production of the new vat dyestuffs. Similarly triazines of the general Formula V, in which X represents a chlorine or bromine atom and R a phenyl radical which in turn may bear alkyl, aryl, hydroxy, alkoxy, trifluormethyl, aminosulfonyl, alkylsulfonyl radicals or chlorine or bromine atoms or may be attached to other benzene nuclei, may be reacted in the above mentioned solvents with vattable amines and the triazines of the general Formula VII:

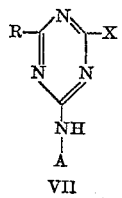

VII necessary for the production of the new vat dyestuffs thus obtained. In the Formulae VI and VII, A represents the radical of a vattable amine and X, Bz and R have the significance given above.

As vattable amines, such as vattable monoamines, vattable diamines, vattable carboxylic amines, vattable heterocyclic amines, vattable amines with three condensed ring systems and vattable amines with five condensed ring systems, especially aminoanthraquinones and aminoanthraquinonebenzeneacridones, there may be mentioned for example: 1- and 2-aminoanthraquinones, 1.4- and 1.5-diaminoanthraquinones, 1-amino-4- or -5-aroylaminoanthraquinones, 1-amino-4-(or -5-, -6- or -7-) halogenanthraquinones, 1-aminoanthraquinone sulfonic acid amides, 1-aminoanthraquinonylmethylsulfones, 1.4-diamino-2-acetylanthraquinone, 1-amino-4 - alkoxyanthraquinones, 4-amino-1(N).2-anthraquinonebenzene acridone and its derivatives containing in the benzene nucleus alkyl, alkylsulfonyl, amidosulfonyl, alkoxy or trifluormethyl groups or halogen, 6'-amino-1(N).2-anthraquinonebenzene acridone and its derivatives containing in the benzene nucleus alkyl, alkylsulfonyl, aminosulfonyl, alkoxy, phenoxy or trifluormethyl groups or halogen, 1.4-diaminoanthraquinones which bear in 2-position the $\mu$-radical of a benzoxazole or benzthiazole which may be substituted further by a phthaloyl radical, 1.4-diaminoanthraquinones which bear in 2-position the radical of a 1.3.4-oxdiazole and 1-aminoanthraquinones which contain in 2-position the radicle of a 1.3.4-oxdiazole-(2) containing an aminophenyl radical in 5-position.

The new vat dyestuffs are preferably built up by allowing quinazolines of the general Formula VI or triazines of the general Formula VII to react in suitable solvents, such as ortho-dichlorbenzene, trichlorbenzene, nitrobenzene or naphthalene, with vattable amines at temperatures between 150° and 220° C., preferably between 170° and 195° C. The new dyestuffs yield on cotton, regenerated cellulose, polyamides and polyurethanes, powerful fast dyeings or prints in shades which in part have hitherto been inaccessible.

The following examples will further illustrate this invention but the invention is not restricted to these examples. The parts in the examples are parts by weight. Where a "half chloride" is referred to in the following examples, it means the hitherto unknown halogen compounds of the general Formulae I, II and III in which X represents a chlorine atom.

Example 1

112 parts of 1-aminoanthraquinone are dissolved in 700 parts of N-methylpyrrolidone. 133 parts of 2.4.6.8-tetrachlorquinazoline are added thereto at 100° C. while stirring. The temperature is then raised to 110° C. and the whole stirred for another hour. It is then allowed to cool. The deposited crystals are filtered off by suction, washed with methanol and dried at 60° C. The yield is 201 parts of the half chloride

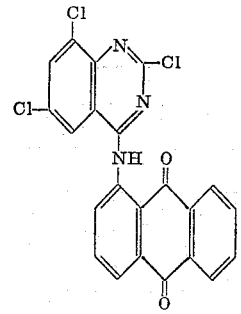

which is obtained in the form of yellow needles.

50 parts of this half chloride are stirred with 34 parts of 4-aminoanthraquinone-1(N).2-benzeneacridone in 840 parts of nitrobenzene for 4 hours at 195° C. Then the temperature is allowed to fall to 100° C. The deposited dyestuff is brought onto a filter and washed first with nitrobenzene at 100° C. and then with cold methanol. The yield after drying is 61 parts of a dark green crystalline powder of the following probable composition:

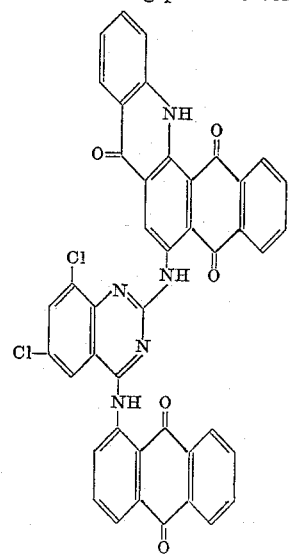

The dyestuff dyes cotton fast yellowish olive-green shades from a blue-red vat.

Example 2

45 parts of the half chloride used in Example 1, 34 parts of 1-amino-5-benzoylaminoanthraquinone and 660 parts of nitrobenzene are kept at 190° C. for three hours while stirring. It is worked up as in Example 1 and 63 parts of a brilliant orange-red crystalline powder are obtained to which the following constitution can be ascribed:

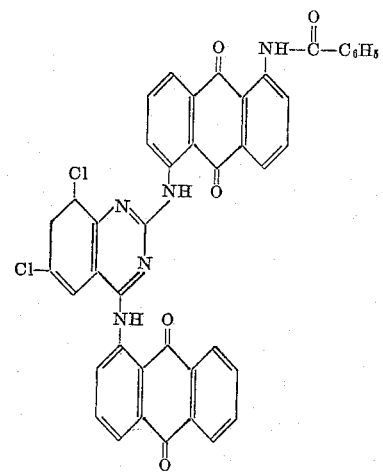

The dyestuff goes on to cotton from a blue-red vat in clear orange-red shades.

With the equivalent amount of 1-amino-4-benzoylaminoanthraquinone instead of the 1.5-compound there is obtained a dyestuff giving red-brown dyeings, and with 1-amino-4-methoxyanthraquinone a dyestuff giving pure red dyeings.

*Example 3*

110 parts of 2.4.6-trichlorquinazoline are stirred into a solution, heated to 100° C., of 170 parts of 1-amino-4-benzoylaminoanthraquinone in 1,300 parts of N-methylpyrrolidone. The whole is then stirred further for two hours at 110° C., allowed to cool and the remaining procedure of the first paragraph of Example 1 followed. The yield is 79 parts of the red crystals of the half chloride:

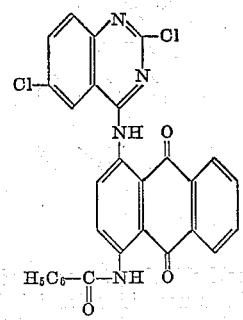

54 parts of this half chloride are stirred for three hours at 180° to 190° C. with 36 parts of 1-amino-5-benzoylaminoanthraquinone and 840 parts of nitrobenzene. The whole is worked up according to the directions in the second paragraph of Example 1 and 53 parts of a dull red powder are obtained. The dyestuff gets on to cotton in wine-red shades and on to polycaprolactam in brown-red shades from a deep red vat. The constitution is probably:

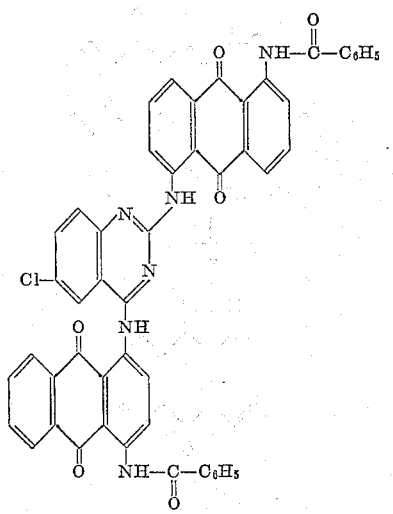

*Example 4*

165 parts of 2.4.6-trichlorquinazoline are introduced into 200 parts of 1.4-diamino-2-acetylanthraquinone and 2,000 parts of N-methylpyrrolidone while stirring at 80° C. Then the temperature is kept at 90° C. for an hour. Then it is allowed to cool to 60° C., whereby crystals separate which are freed from their mother liquor at 60° C. The crystal cake is washed with 200 parts of cold N-methylpyrrolidone and then with methanol. The lustrous blue-black needles are dried at 60° to 80° C. The yield is 282 parts and the constitution:

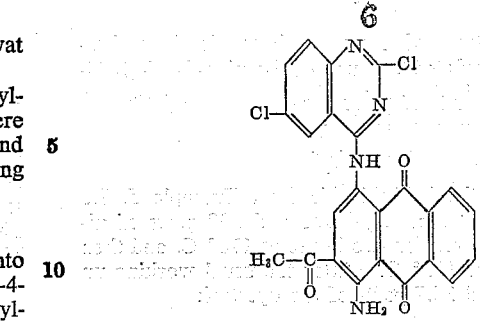

Corresponding to the foregoing Examples, 24 parts of this half chloride are reacted with 13 parts of 1-aminoanthraquinone in 420 parts of nitrobenzene. 30 parts of a grey crystal powder are obtained which dyes cotton silver-grey shades from a brown-red vat. The constitution of the dyestuff is probably:

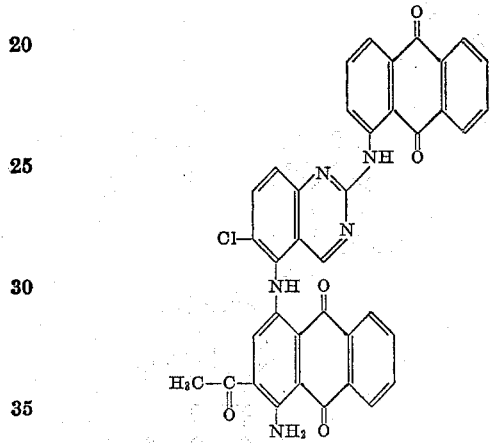

The equivalent amount of 1-amino-4-benzoylaminoanthraquinone instead of 1-aminoanthraquinone gives a violet dyestuff which dyes cotton reddish blue from a red-brown vat.

*Example 5*

140 parts of 1.4-diamino-2-acetylanthraquinone, 1,400 parts of N-methylpyrrolidone and 130 parts of 2.4.6.8-tetrachlorquinazoline are brought together at 70° C. and then stirred for one hour at 90° C. The mother liquor is removed by suction from the crystals formed at 60° C., and the residue washed first with 150 parts of N-methylpyrrolidone and then with methanol and finally dried. The yield is 168 parts.

26 parts of this half chloride, 18 parts of 1-amino-5-benzoylaminoanthraquinone and 580 parts of nitrobenzene are stirred with each other for three hours at 190° C. After the usual working up, 36 parts of a grey crystal powder are obtained which goes on to cotton in neutral grey shades from a red-violet vat. The constitution is probably:

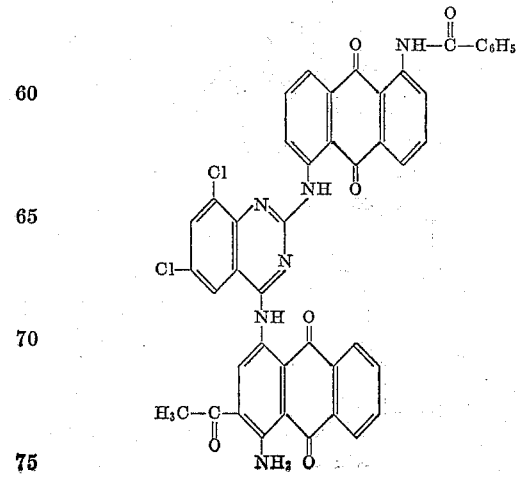

By using, instead of 1-amino-5-benzoylaminoanthraquinone, the calculated amount of 1-amino-5-(4'-(N,N-dimethylsulfonamido))-benzoylaminoanthraquinone, a green-grey dyestuff is is obtained.

Example 6

33.6 parts of the half-chloride from Example 5, 7.2 parts of 1.5-diaminoanthraquinone and 500 parts of nitrobenzene are stirred for two hours at 170° C. and then for three hours at 195° C. After the usual working up there are obtained 36.7 parts of the dyestuff:

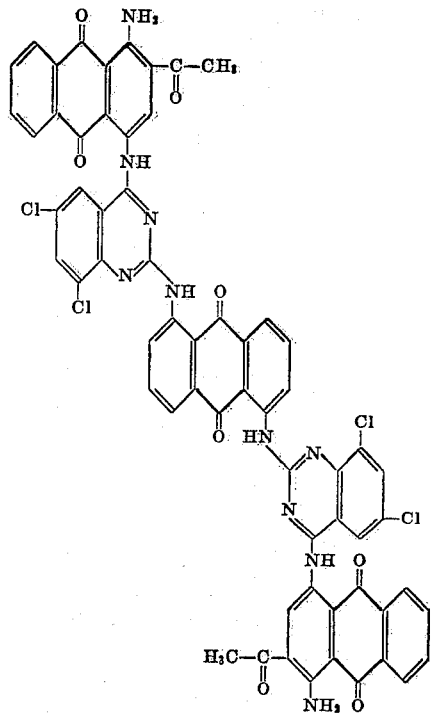

which dyes cotton steel-grey shades from a red-brown vat.

Example 7

51 parts of the half-chloride from Example 5, 34 parts of 4-amino-1(N).2-anthraquinonebenzeneacridone and 840 parts of nitrobenzene are stirred for three hours at 195° C. It is worked up as in Example 1, second paragraph, and there is obtained in a yield of 57 parts a vat dyestuff which dyes cotton blue-green from a red-violet vat. The constitution is:

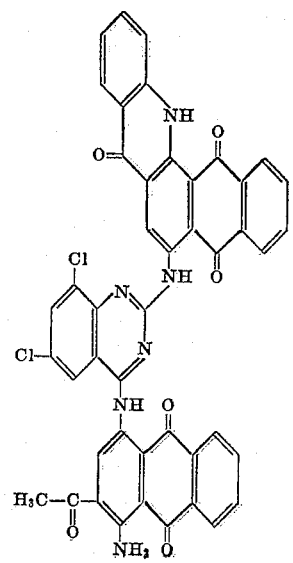

Example 8

200 parts of 2-phenyl-4.6-dichlortriazine-1.3.5 are added while stirring to a solution, heated to 90° C., of 200 parts of 1-aminoanthraquinone in 900 parts of N-methylpyrrolidone, the mixture is heated to 100° C. and kept for an hour at this temperature. Yellow crystals separate out the amount of which increases on cooling. They are washed with methanol and dried at 60° C. The yield is 283 parts and the constitution:

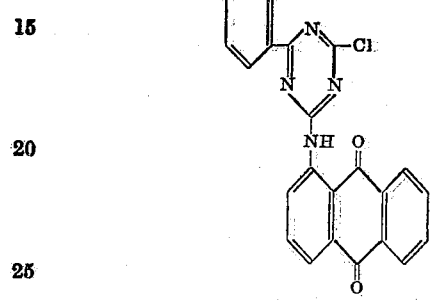

42 parts of this half chloride, 34 parts of 4-aminoanthraquinone-1(N).2-benzeneacridone and 840 parts of nitrobenzene are stirred for four hours at 195° C. After the usual working up, 64 parts of blue-green crystals are obtained which dye cotton olive-green from a red-violet vat. The constitution is probably:

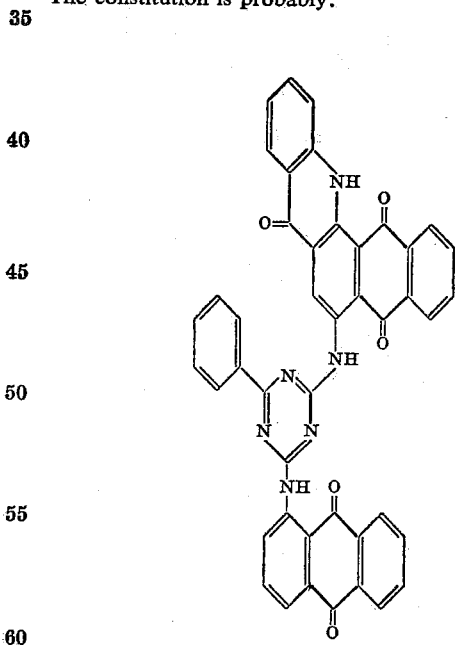

With 2-aminoanthraquinone instead of 1-aminoanthraquinone, a dyestuff is obtained which dyes cotton clear green from a red-violet vat.

Example 9

47 parts of the half chloride obtained in accordance with Example 8 from 2-phenyl-4.6-dichlortriazine-1.3.5 and 1.4-diamino-2-acetylanthraquinone in N-methylpyrrolidone, are stirred for three hours at 195° C. with 34 parts of 4-aminoanthraquinone-1(N).2-benzeneacridone and 840 parts of nitrobenzene. It is worked up according to Example 1, paragraph 2, and 70 parts of a reddish blue powder are obtained which dyes cotton neutral blue shades from a red-violet vat. The constitution is probably:

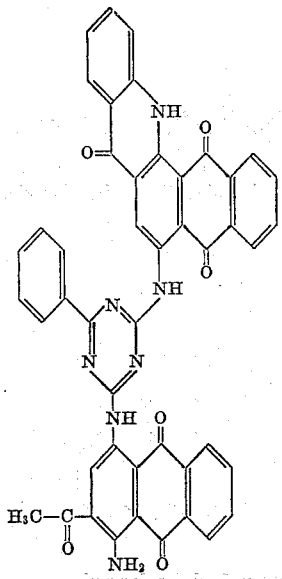

Example 10

23.5 parts of the half chloride from 2-phenyl-4.6-dichlortriazine-1.3.5 and 1.4-diamino-2-acetylanthraquinone already used in Example 9 are stirred for three hours at 170° C. with 19 parts of 6'-amino-3'-chloranthraquinone-1(N).2-benzeneacridone and 300 parts of nitrobenzene. It is worked up as in Example 1, paragraph 2, and 38 parts of a violet powder are obtained which dyes cotton blue-violet shades from a red-violet vat. The constitution of the dyestuff is probably:

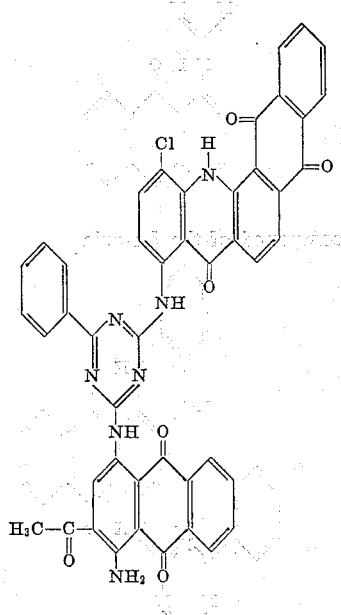

Example 11

The procedure of Example 10 is followed but instead of 19 parts of 6'-amino-3'-chloranthraquinone-1(N).2-benzeneacridone there are used 22 parts of 6'amino-3' phenoxyanthraquinone - 1(N).2 - benzeneacridone. 40 parts of a dark blue powder are obtained which dyes cotton reddish blue shades from a red-violet vat. Its constitution is probably:

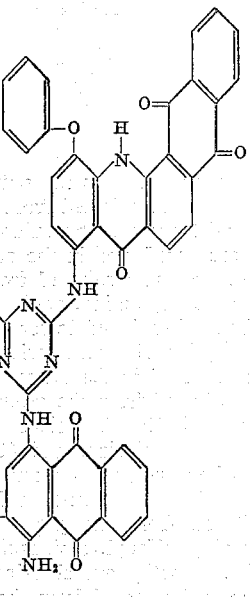

We claim:
1. A process for the production of a compound selected from the group consisting of

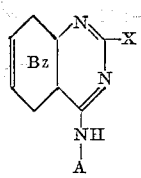

and

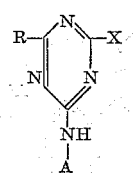

wherein X is a member selected from the group consist- of chlorine and bromine, Bz represents a member selected from the group consisting of the unsubstituted benzene nucleus and the benzene nucleus substituted by a member selected from the group consisting of chlorine, bromine, lower alkyl, phenyl, trifluoromethyl, aminosulfonyl and lower-alkylsulfonyl, R represents a member selected from the group consisting of the unsubstituted phenyl radical and the phenyl radical substituted by a member selected from the group consisting of chlorine, bromine, lower alkyl, lower alkoxy, hydroxy phenyl, trifluoromethyl, aminosulfonyl and lower alkylsulfonyl, and A represents a radical selected from the group consisting of the anthraquinonyl and anthraquinonebenzeneacridonyl radicals, which process comprises heating to a temperature of between 50° C. and 150° C. in N-methylpyrrolidone as a solvent a mixture of about equal molar quantities of a compound selected from the group consisting of

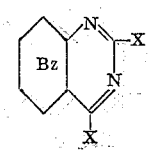

and

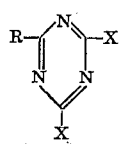

wherein X, Bz and R have the same meaning as above and a vattable amine selected from the group consisting of (A) 1- and 2-aminoanthraquinone and their derivatives which are substituted in the anthraquinone nucleus by at least one member selected from the group consisting of amino, benzoylamino, acetyl, sulfonic acid amide, methyl sulfone, phenyl and lower alkoxy, (B) 4-amino-1(N).2-anthraquinonebenzene acridone and its derivatives which are substituted in the benzene nucleus by at least one member selected from the group consisting of lower alkyl, lower alkylsulfonyl, amidosulfonyl, lower alkoxy, trifluormethyl and chlorine, and (C) 6'-amino-1(N).2-anthraquinonebenzene acridone and its derivatives which are substituted in the benzene nucleus by at least one member selected from the group consisting of lower alkyl, lower alkylsulfonyl, aminosulfonyl, lower alkoxy, phenoxy, trifluoromethyl and chlorine.

2. A compound selected from the group consisting of

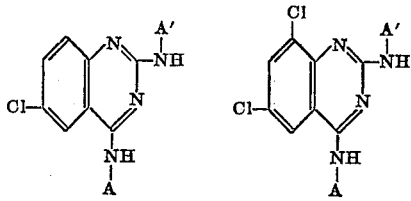

and

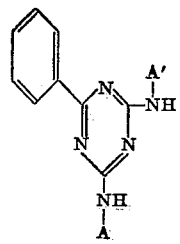

wherein A represents a radical selected from the group consisting of

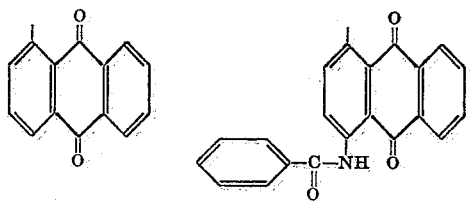

and

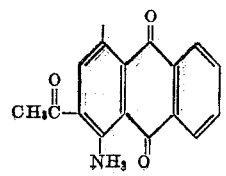

and A' represents a radical selected from the group consisting of

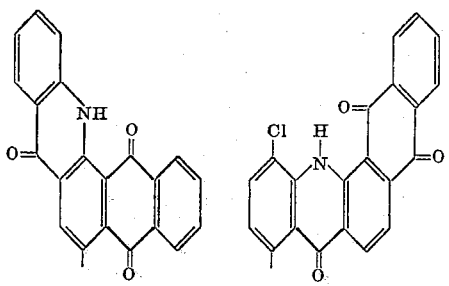

and

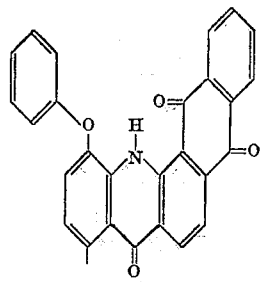

3. The compound of the formula

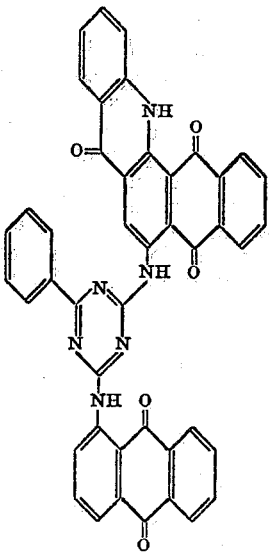

4. The compound of the formula

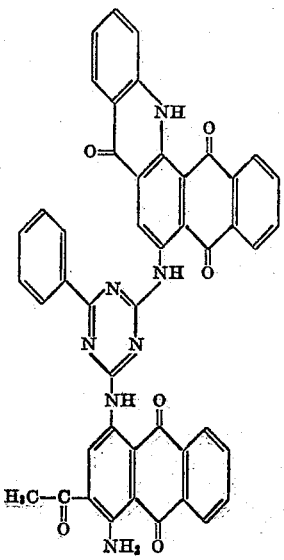

5. The compound of the formula
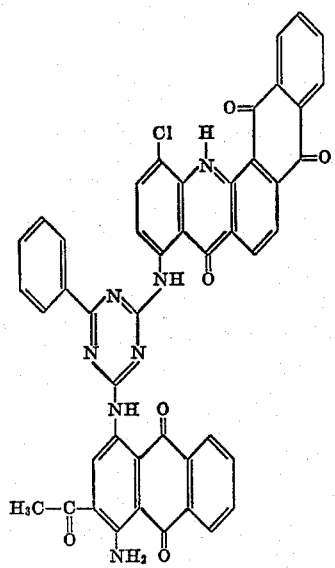
6. The compound of the formula
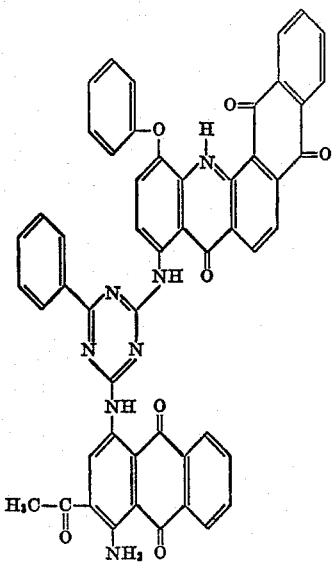
References Cited in the file of this patent
UNITED STATES PATENTS
2,731,464   Ebel ------------------ Jan. 17, 1956
FOREIGN PATENTS
449,477   Great Britain ---------- June 24, 1936